United States Patent [19]

Mehta

[11] Patent Number: 5,781,464

[45] Date of Patent: Jul. 14, 1998

[54] APPARATUS AND METHOD FOR INCREMENTING FLOATING-POINT NUMBERS REPRESENTED IN DIFFRENT PRECISION MODES

[75] Inventor: Anup S. Mehta, Santa Clara, Calif.

[73] Assignee: Intel Corporation, Santa Clara, Calif.

[21] Appl. No.: 575,881

[22] Filed: Dec. 20, 1995

[51] Int. Cl.[6] ............................................. G06F 7/50
[52] U.S. Cl. .............................. 364/748.01; 364/748.02; 364/745.02; 364/770
[58] Field of Search .......................... 364/748, 745, 364/770, 748.01, 748.02, 745.02

[56] References Cited

U.S. PATENT DOCUMENTS

5,109,480   4/1992   Sone et al. ....................... 395/131
5,228,126   7/1993   Marianetti, II ..................... 395/162

*Primary Examiner*—David H. Malzahn
*Attorney, Agent, or Firm*—Blakely, Sokoloff, Taylor & Zafman

[57] ABSTRACT

An incrementer for performing floating-point calculations is capable of incrementing a floating-point number represented in one of several different precision modes. The incrementer includes various incrementer portions coupled to one another and associated with the different precision modes. Circuitry is coupled to the incrementer portions to partition the floating-point number into numerous bit segments, each bit segment having an associated number. A logic circuit is coupled between a pair of said incrementer portions for controlling the incrementing of the bit segments.

18 Claims, 9 Drawing Sheets

FIG. 11

APPARATUS AND METHOD FOR INCREMENTING FLOATING-POINT NUMBERS REPRESENTED IN DIFFRENT PRECISION MODES

BACKGROUND OF THE INVENTION

1. Field of the Invention

The present invention relates to an incrementer used in the rounding operation of floating-point numbers. More specifically, an incrementer capable of properly incrementing floating-point numbers of different precision types.

2. Background

Computer systems use various formats to represent numbers used in calculations and processing of information. Floating-point numbers are commonly used to represent decimal and fractional numbers. Floating-point numbers are represented using two portions: a first portion, called the mantissa, contains the numbers or bits which represent the magnitude of the number, and a second portion, called the exponent, contains information relating to the position of the radix point within the mantissa. For example, a floating-point number used in a binary system may be illustrated by the following formula:

$$\text{Floating-Point Number} = \text{mantissa} \times 2^{exponent}$$

where the radix is 2 for a binary system.

A floating-point number is said to be "normalized" when the most significant position of the mantissa is a non-zero digit. In a binary system, a normalized floating-point number will contain a "1" as the most significant bit, since "1" is the only non-zero digit available in a binary numbering system. In effect, the normalizing process removes all leading zeros from the mantissa of the floating-point number.

When normalizing a floating-point number, the exponent must be adjusted for each leading zero removed from the mantissa. For example, if three leading zeros are removed from the mantissa, then the exponent value must be reduced by three. An example of the normalization process is illustrated as follows:

$$\text{UnNormalized Number} = 00010110 \times 2^{101}$$

$$\text{Normalized Number} = 10110000 \times 2^{010}$$

As the above example illustrates, the mantissa of the unnormalized number contains three leading zeros and the exponent contains a value of 101 (binary). After normalization, the three leading zeros have been removed from the mantissa and three trailing zeros have been appended to the end of the mantissa. Thus, the mantissa has been shifted three bit positions to the left. To compensate for this shifting, the exponent value is reduced by three. Therefore, the actual values represented by the unnormalized number and the normalized number are equivalent.

Those skilled in the art will appreciate that both the mantissa and the exponent generally contain a sign bit preceding the value. These sign bits, as well as the radix points, have been omitted from the above discussion for clarity purposes.

Computer systems often provide several types of precision associated with floating-point numbers, such as single precision, double precision, and extended precision. The number of bits required to represent a floating-point number varies based on the precision type selected. Double precision numbers require a greater number of bits than single precision numbers. Similarly, extended precision numbers require more bits than double precision numbers. Thus, the higher the precision, the greater number of bits required to represent the number.

Although a different number of bits are required for each precision mode, all floating-point numbers in a computer system are typically represented using the same number of bits, regardless of the precision mode being used. The bit length of the highest precision mode is used for all numbers. The highest precision mode will utilize all available bits, while lower precision numbers will only use a portion of the available bits.

During the rounding process of a floating-point number, an incrementing procedure is implemented if the number must be rounded up. The incrementing procedure begins with the least significant bit (LSB) of the mantissa. The position of the LSB varies with the precision type being represented. The LSB for a highest precision number is in the LSB position of all available bits. The LSB for lesser precision numbers will be located between the LSB and the most significant bit (MSB) of all available bits. Therefore, the position of the LSB of the mantissa must be determined before the incrementing procedure can be performed.

A simple incrementer always adds "1" to the LSB. Thus, using a simple incrementer in a situation where numbers of different precisions are used will always increment the LSB of all available bits, thereby producing accurate results only for numbers of the highest precision type. Numbers of the lesser precision types will not be incremented properly.

Another type of incrementer provides a different, independent incrementer circuit for each available precision type. This solution requires multiple circuitry for performing similar operations, thereby increasing the overall cost and complexity of the incrementing system.

It is therefore desirable to provide a single incrementer capable of properly incrementing floating-point numbers of different precision types.

SUMMARY OF THE INVENTION

The present invention provides an incrementer used in the rounding operation of floating-point numbers and capable of incrementing floating-point numbers represented in different precision modes. The incrementer includes a minimal amount of additional circuitry beyond that required by a simple incrementer. Furthermore, the present invention does not add any significant delay to the incrementing process, regardless of the precision mode. Thus, a single incrementer provides incrementing functions for numbers represented in different precision modes using a minimal amount of additional circuitry.

In one embodiment of the present invention, several incrementer portions are coupled to one another. Each incrementer portion is associated with at least one of the different precision modes. Circuitry is provided to partition the floating-point number into various bit segments. Each bit segment of the floating-point number has an associated number. A logic circuit is coupled between two of the incrementer portions and controls the incrementing of the bit segments.

Another feature of the present invention provides at least one logic cell in each incrementer portion. Each logic cell generates a portion of the incremented floating-point number in response to an input signal and the bit segments. The logic cells contain several inverters and multiplexers.

A specific embodiment of the present invention utilizes three incrementer portions, each portion associated with a particular floating-point precision mode. A pair of logic devices are coupled to the three incrementer portions and associated with one of the floating-point precision modes.

One aspect of the present invention involves partitioning a floating-point number into various bit segments. Each bit segment of the floating-point number is then incremented using one of the incrementer portions. The incremented bit segments are then concatenated to generate an incremented floating-point number.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the present invention. However, those skilled in the art will appreciate that the present invention may be practiced without these specific details. In other instances, well known methods, procedures, components, and circuits have not been described in detail so as not to obscure the present invention.

Figure 1:
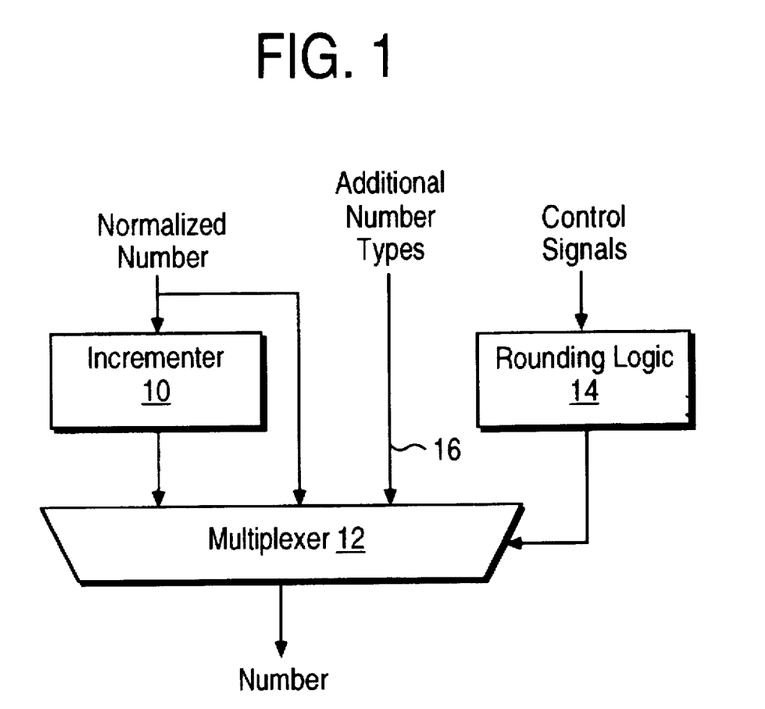
FIG. 1 is a block diagram showing a portion of a floating-point processor.

The present invention comprises an incrementer used to increment floating-point numbers of different precision types. Referring to FIG. 1, a block diagram illustrates a portion of a floating-point processor. The floating-point processor may be a implemented in either hardware or software. A normalized number is provided to an incrementer 10 and a multiplexer 12. Additional number types (infinity, indefinite numbers, etc.) are provided to multiplexer 12 on line 16. Incrementer 10 increments the normalized number and provides the incremented number to multiplexer 12. A rounding logic circuit 14 receives control signals that determine whether the particular number being processed should be rounded. This determination is communicated to multiplexer 12 which then selects the normalized number (not incremented), the incremented number, or one of the additional number types depending on the control signals.

Figure 2:
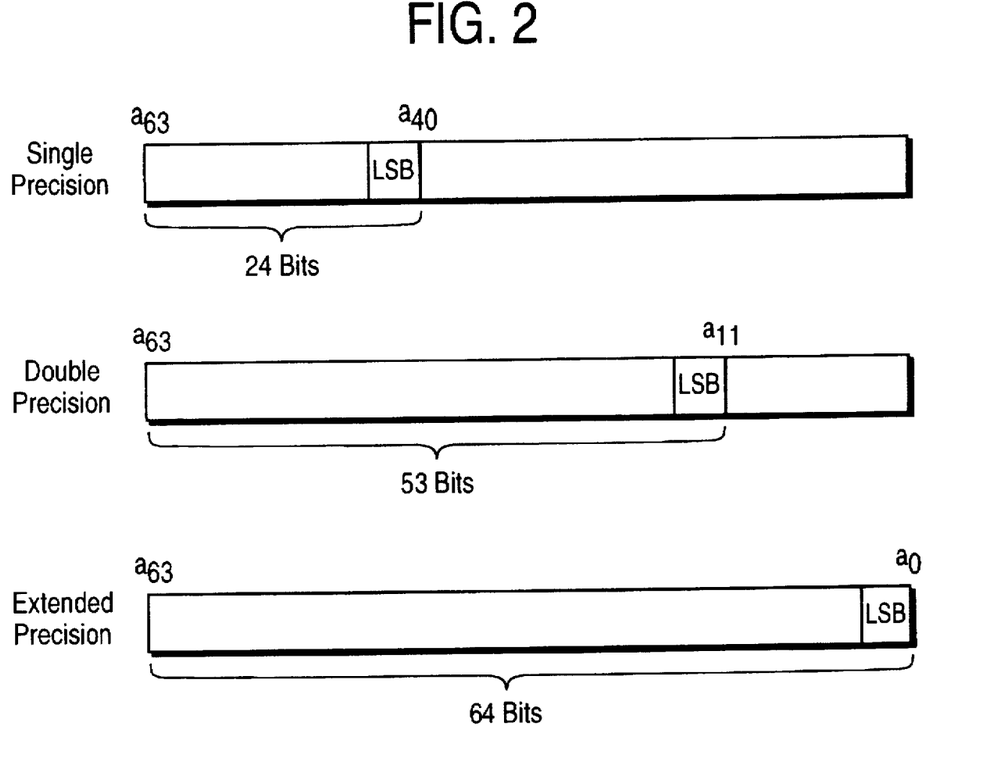
FIG. 2 is an illustration of the bits used in floating-point numbers of various precision types.

Referring to FIG. 2, three different precision types of floatingpoint numbers are illustrated. The three precision types illustrated (single precision, double precision, and extended precision) each include a mantissa having 64 bits. The single precision number requires 24 bits to represent the mantissa, bits $a_{63}$-$a_{40}$. The remaining bits $a_{39}$- $a_0$ are not used by the single precision number. The double precision number requires 53 bits to represent the mantissa, bits $a_{63}$- $a_{11}$. The remaining bits $a_{10}$-$a_0$ are not used by the double precision number. The extended precision number requires all 64 bits to represent the mantissa.

As shown in FIG. 2, the location of the least significant bit (LSB) is different for each precision type. The LSB is at bit location $a_{40}$ in the single precision number, $a^{11}$ in the double precision number, and $a_0$ in the extended precision number.

The numbers shown in FIG. 2 are provided by way of example only. The present invention may be applied to a variety of precision types as well as numbers having different bit lengths. Thus, the present invention is not limited to the three precision types illustrated in FIG. 2 and is not limited to a mantissa having 64 bits.

Figure 3:
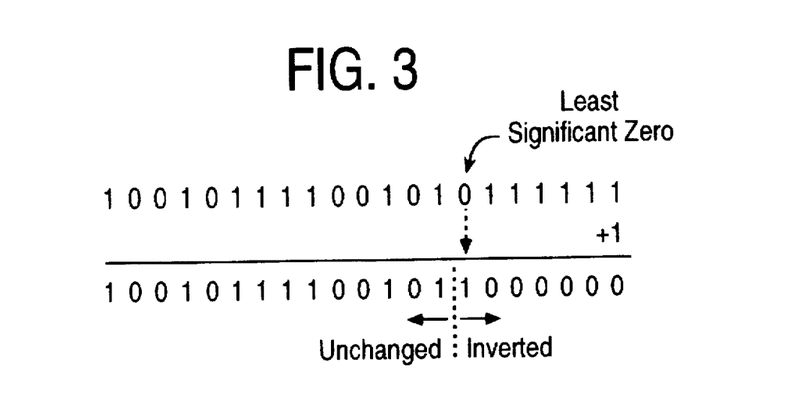
FIG. 3 is an illustration of the incrementing process as performed on a binary number.

Referring to FIG. 3, a method for incrementing a binary number is illustrated. This method locates the least significant zero in the mantissa. The least significant zero and all bits of lesser significance are inverted. All bits of greater significance than the least significant zero are unchanged. As shown in FIG. 3, the least significant zero and the six bits of lesser significance are inverted. The fourteen bits of greater significance are unchanged. Those skilled in the art will understand that the above method is one example of a binary incrementer and that other methods may be used for binary incrementing.

Figure 4:
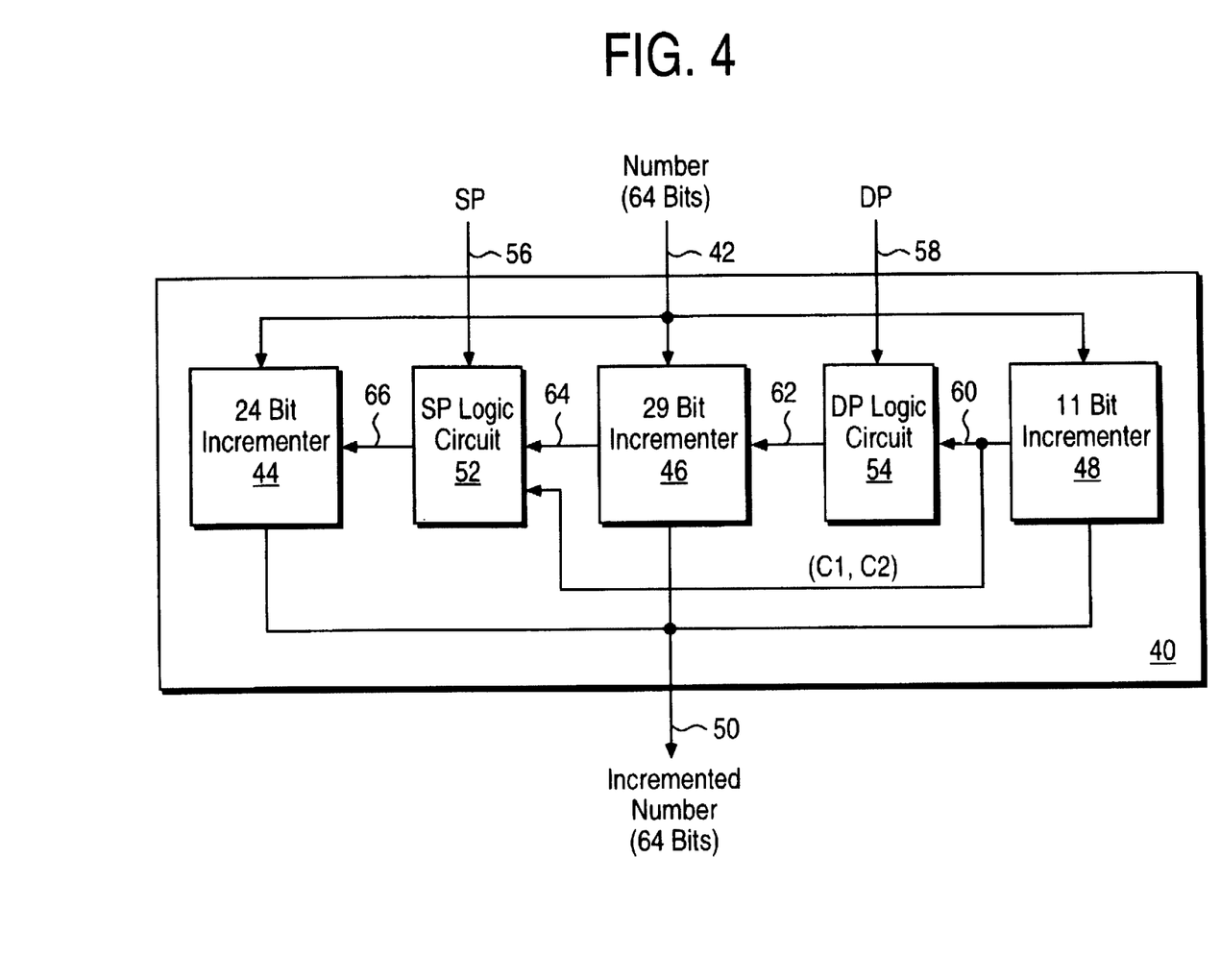
FIG. 4 is a block diagram of an incrementer according to the present invention capable of incrementing floating-point numbers of different precision types.

FIG. 4 is a block diagram of an incrementer capable of incrementing floating-point numbers of different precision types in accordance with the present invention. An incrementer 40 includes three incrementer portions 44, 46, and 48. Incrementer 40 is designed for use with a 64 bit binary mantissa, which is provided on an input line 42. The mantissa to be incremented is partitioned into three different bit segments, an 11 bit segment processed by incrementer portion 48, a 29 bit segment processed by incrementer portion 46, and a 24 bit segment processed by incrementer portion 44. Each bit segment includes an associated number: 11 bits, 29 bits, and 24 bits, respectively. Thus, the three incrementer portions are capable of incrementing a 64 bit number. Division of the bit segments in the above manner allows all incrementing logic to be performed using only combinations of 5-bit and 6-bit logic components, as discussed below.

A single precision logic circuit 52 is connected between incrementer portions 44 and 46. Logic circuit 52 receives a signal SP on input line 56 indicating whether the number being incremented is a single precision number. If SP is high, then the number is a single precision number. If SP is low, then the number being incremented is either double precision or extended precision. A double precision logic circuit 54 is connected between incrementer portions 46 and 48, and receives a signal DP on input line 58. Signal DP indicates whether the number being incremented is a double precision number. If DP is high, then the number is double precision. If both SP and DP are low, then the number being incremented is an extended precision number. Interconnections 60, 62, 64, and 66, located between the incrementer portions and the logic circuits, transmit information regarding the status of the incrementing process. Interconnection 60 transmits signals from incrementer 48 to both logic circuit 52 and logic circuit 54. An output line 50 connects the outputs from the various incrementer portions 44–48 and provides the incremented 64 bit number to the next stage of the system (not shown).

If the number received on input line 42 is a single precision number, indicated by signal SP, only 24 bit incrementer 44 is required to increment the number. The two remaining incrementer portions 46 and 48 will process portions of the number, but the outputs are not utilized. In this case, the incrementing process does not depend on any logic circuits other than circuit 52. Therefore, the single precision number is incremented quickly. If the number received on input line 42 is a double precision number, indicated by signal DP, both the 24 bit incrementer 44 and the 29 bit incrementer 46 are required to increment the number. In this situation, the output from the 11 bit incrementer 48 is not utilized. In this situation, the incrementing process does not wait for 11 bit incrementer 48 to finish it calculations, thereby providing a fast incrementing process. If the number received on input line 42 is an extended precision number, then all three of the incrementer portions 44–48 are required to increment the number. In this case, the outputs from all incrementer portions are used to represent the incremented number.

As discussed above, the incrementing process begins with the LSB of the number being incremented, and inverts each bit until the least significant zero is located. The least significant zero bit is then inverted, and the remainder of the bits are unchanged. Therefore, the LSB of any number being incremented is always inverted. If the LSB is a zero, the bit is the least significant zero, which is inverted. If the LSB is a one, the bit is inverted, and the next significant bit is analyzed for a zero value.

As illustrated in FIG. 4, the LSB of a single precision number is located in incrementer 44. Therefore, the existence of a zero bit in incrementers 46 or 48 is unimportant and the incrementing process begins with the least significant bit in incrementer 44. The necessary control to begin incrementing in incrementer 44 is provided by SP logic circuit 52. Similarly, the LSB of a double precision number is located in incrementer 46. In this situation, the existence of a zero bit in incrementer 48 is unimportant.

Figure 5:
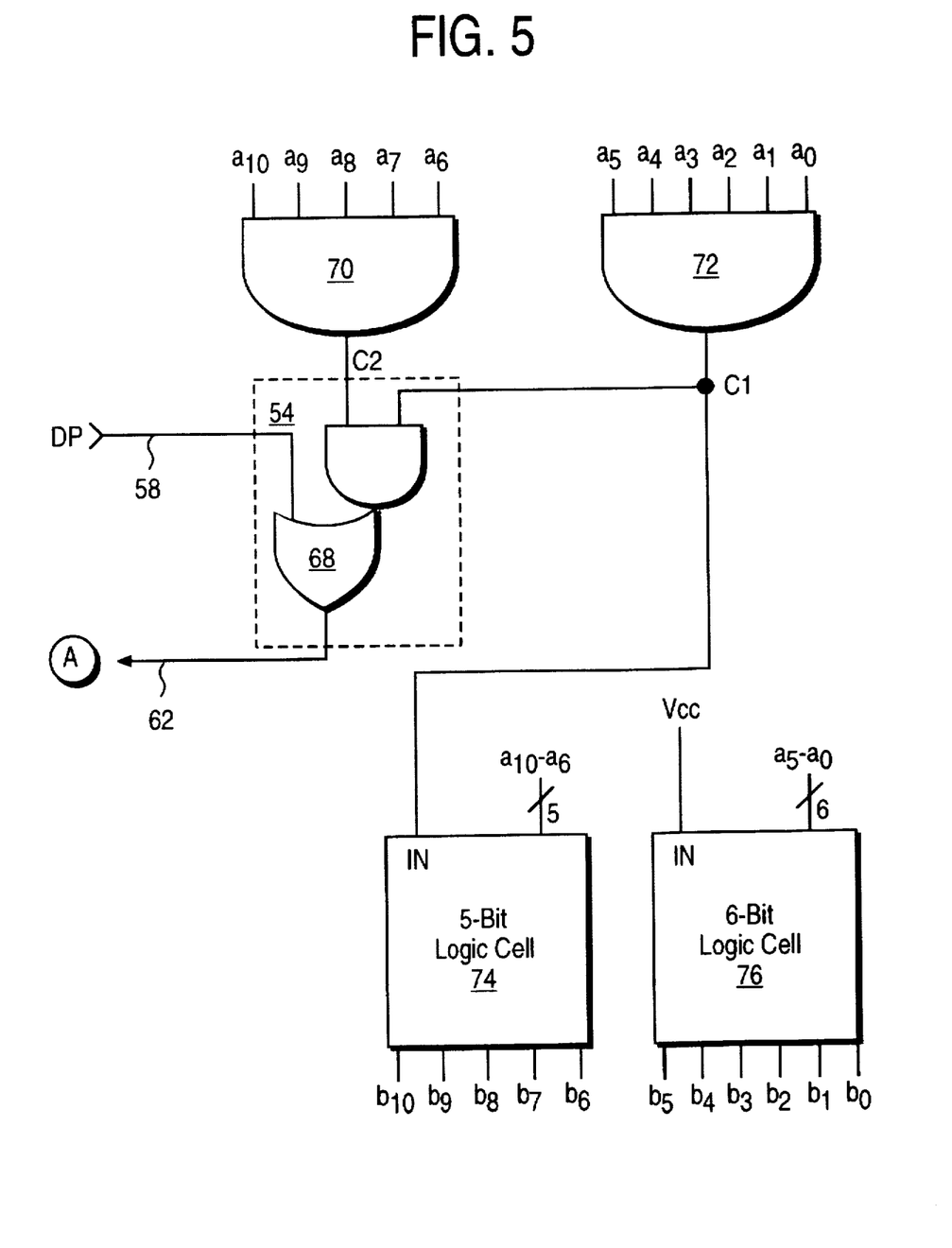
FIG. 5 a diagram of the 11 bit incrementer and double precision logic circuit of FIG. 4.
Figure 6:
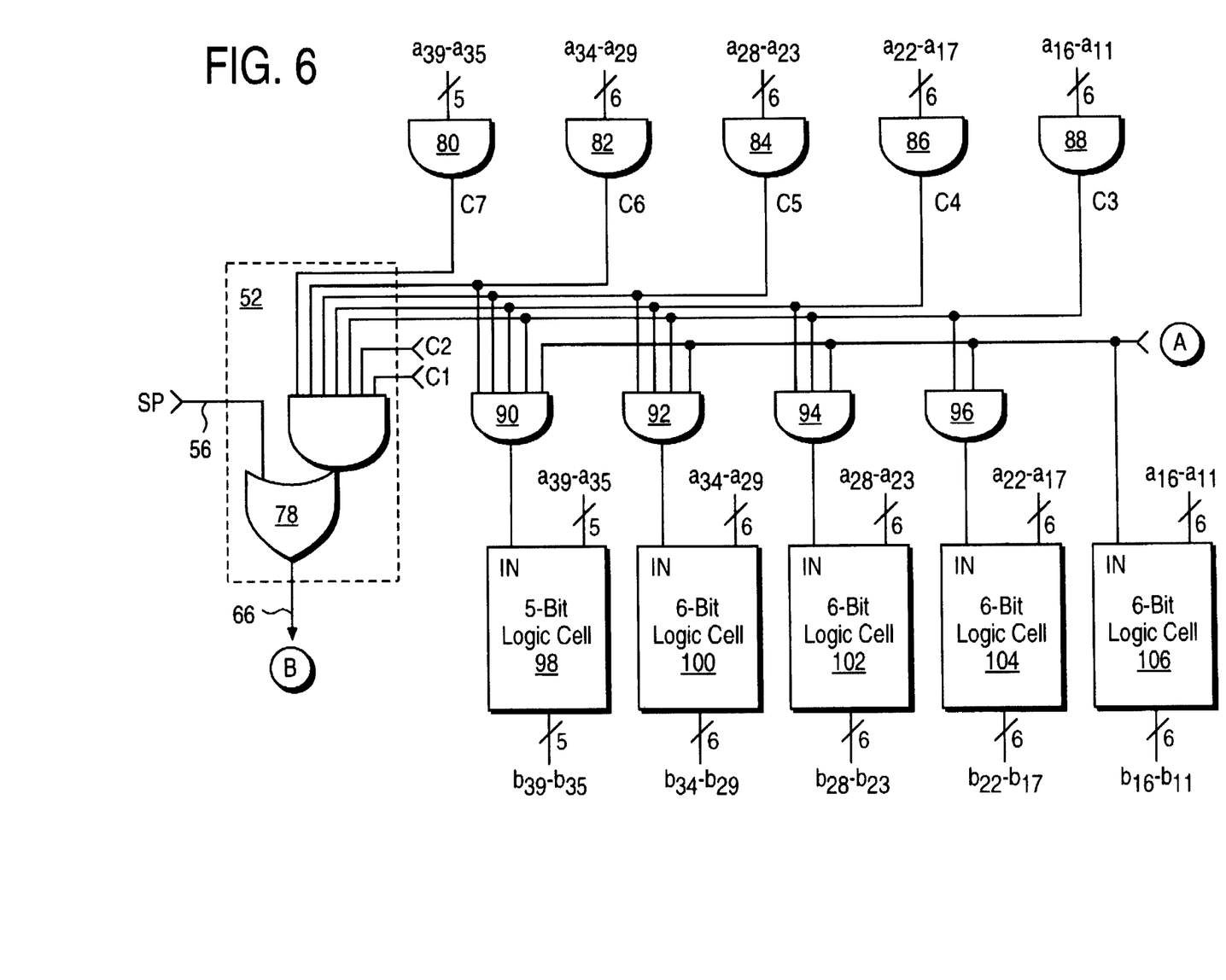
FIG. 6 is a diagram of the 29 bit incrementer and single precision logic circuit of FIG. 4.
Figure 7:
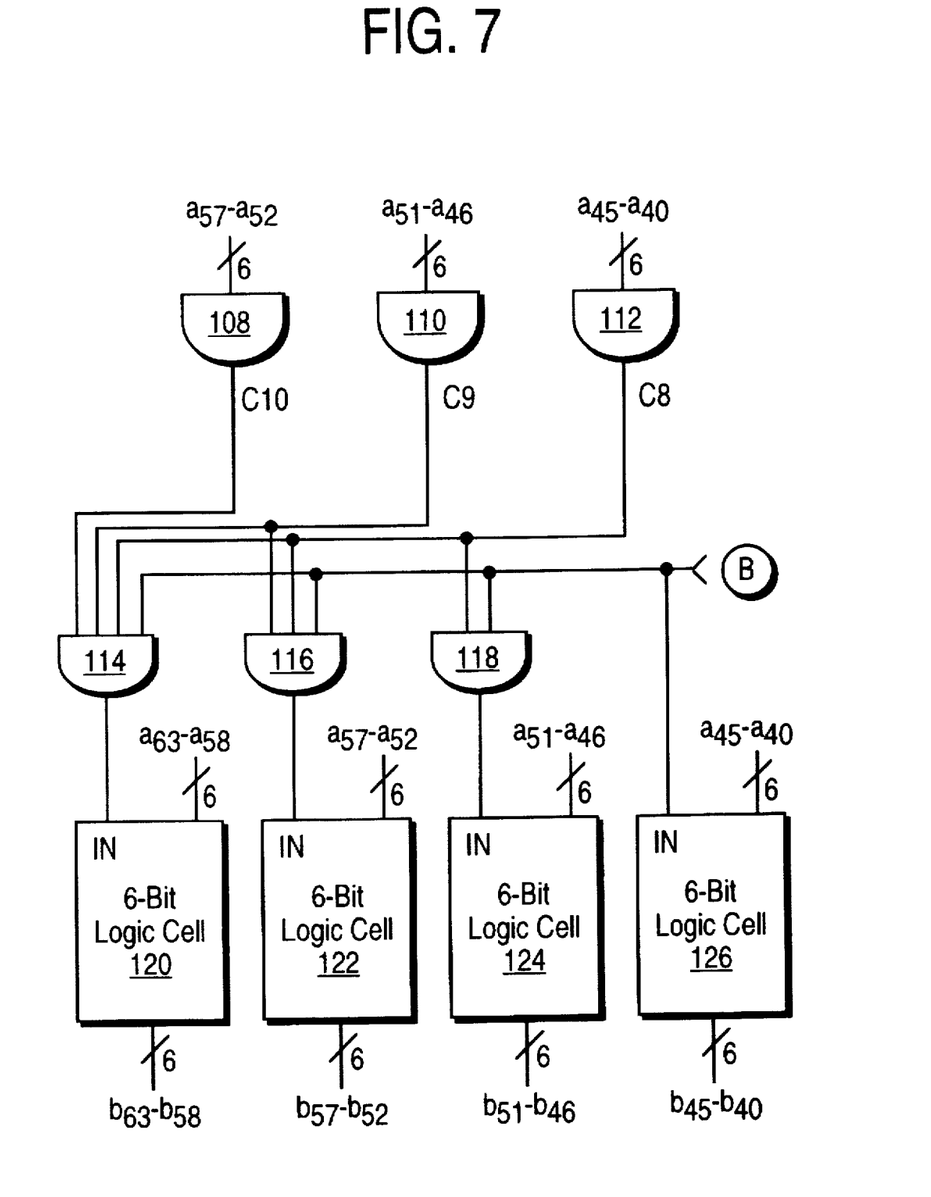
FIG. 7 is a diagram of the 24 bit incrementer of FIG. 4.

As illustrated in FIGS. 5–7 and described below, each incrementer portion contains logic cells for incrementing a particular bit segment of the number. Additionally, each incrementer portion contains logic AND gates for indicating to other bit segments and logic cells whether a zero was found in a bit of lesser significance.

Referring to FIG. 5, a diagram of the 11 bit incrementer 48 and double precision logic circuit 54 is shown. A 5-input logic AND gate 70 and a 6-input logic AND gate 72 receive the 11 least significant bits of the number to be incremented. Gate 70 generates a signal C2 and gate 72 generates a signal C1. A high signal for C1 indicates that all six of the least significant bits are one. If any of the six least significant bits are zero, then signal C1 will be low. Signal C1 provides an indication to circuits processing more significant bits whether or not a zero has been found in a bit of lesser significance. For example, a 6-bit logic cell 76 increments bits $a_5$-$a_0$, the six least significant bits of the number. A 5-bit logic cell 74 increments the next five bits, $a_{10}$-$a_6$. If signal C1 is low, indicating a zero in bits $a_5$-$a_0$, then logic cell 74 will not invert any of the bits $a_{10}$-$a_6$, because the least significant zero was already found in a less significant bit. Similarly, signal C2, generated by gate 70, indicates whether a zero was found in any of the bits $a_{10}$-$a_6$. Each logic cell 74 and 76 also determines whether a least significant zero was found among its own inputs.

Double precision logic circuit 54 is illustrated in FIG. 5 as having an AND-OR gate 68. Signals C1 and C2 are connected to the AND gate inputs of AND-OR gate 68 and signal DP is connected to an OR gate input. As discussed above, if signal DP is high, then the number being incremented is a double precision number. In that case, the least significant bit is $a^{11}$, and bits $a_{10}$-$a_0$ can be ignored (see FIG. 2). If signal DP is high, then a high signal is generated on line 62, regardless of the values of signals C1 and C2. The high signal on line 62 is carried to the more significant incrementer portions and indicates that a least significant zero has not yet been found. If a zero was found in any of bits $a_{10}$-$a_0$, the low value of signal C1 and/or C2 is overridden by the high DP signal.

If signal DP is low, then the value on line 62 is determined by the values of C1 and C2. If both C1 and C2 are high, indicating the absence of a zero in any of bits $a_{10}$-$a_0$, then the value on line 62 is high. However, if either C1 or C2 is low, then the value on line 62 is low, indicating that a zero was found in at least one of the bits $a_{10}$-$a_0$. The signal on line 62 is transmitted to incrementer portion 46, as further described with respect to FIG. 6.

The 6-bit logic cell 76, shown in FIG. 5, receives bits $a_5$-$a_0$ as well as a logic high signal connected to an input line. The input line is an indication to the logic cell whether or not a zero has already been found in a less significant bit position. Therefore, the signal on the input line indicates whether the logic cell should invert the values of the input bits coupled to that cell. Since logic cell 76 increments the six least significant bits, there cannot be any less significant zeros, and the input pin is pulled high. Logic cell 76 also determines whether a least significant zero exists on bits $a_5$-$a_0$, and increments the bits accordingly. Logic cell 76 provides six output lines for bits $b_5$-$b_0$, representing the six least significant bits of the incremented number.

The 5-bit logic cell 74 receives bits $a_{10}$-$a_6$ and signal C1. Signal C1 indicates to logic cell 74 whether a zero has been found in bits $a_5$-$a_0$, thereby permitting the logic cell to determine whether or not to invert bits $a_{10}$-$a_6$. If a zero was found in bits $a_5$-$a_0$, indicated by a low C1 signal, then bits $a_{10}$-$a_6$ are not inverted. However, if no zeros were found in bits $a_5$-$a_0$, indicated by a high C1 signal, then bits $a_{10}$-$a_6$ are checked for zeros and inverted accordingly. Logic cell 74 provides five output lines for bits $b_{10}$-$b_6$, representing bits of the incremented number.

Figure 8:
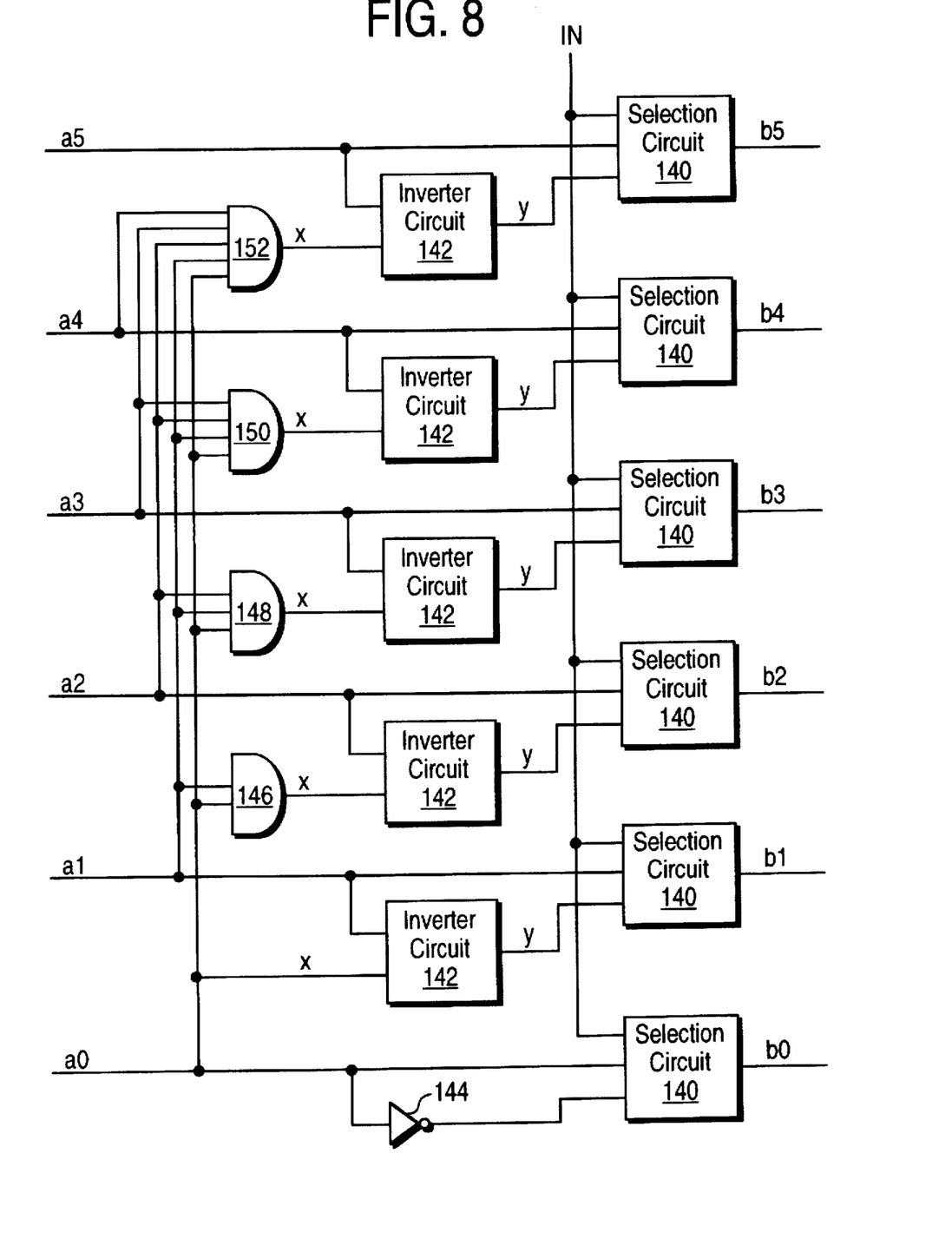
FIG. 8 is a diagram of the 6-bit logic cell of FIGS. 5-7.

As discussed above, logic cells are provided to increment portions of the number being incremented. FIG. 8 illustrates a diagram of a 6-bit logic cell, such as logic cell 76 shown in FIG. 5. The circuit shown in FIG. 8 receives six bits, labeled $a_5$-$a_0$ and an input signal IN. As described above, the IN signal provides an indication of whether a zero was found in a bit of lesser significance. Six output bit lines $b_5$-$b_0$ provide the incremented bit values. The logic cell contains six selection circuits 140 and five inverter circuits 142. Each inverter circuit 142 is capable of generating an inverted or a non-inverted version of a particular bit. Each selection circuit 140 receives the IN signal, the non-inverted bit, and the output from inverter circuit 142. Selection circuit 140 then selects either the non-inverted version of the bit or the output from circuit 142 based on signal IN, and provides the selected bit version to the incremented bit line. Additional details regarding circuits 140 and 142 are provided in FIGS. 9 and 10.

If signal IN is low, indicating that the least significant zero has already been located, then selection circuit 140 selects the non-inverted version of the bit, thereby passing the bit unchanged. In this situation, the presence of a zero on any of the input lines $a_5$-$a_0$ does not change the output of selection circuit 140. Similarly, the functions performed by the inverter circuit 142 do not alter the operation of selection circuit 140. However, if signal IN is high, indicating that the least significant zero has not been located, then the signal generated by inverter circuit 142 will be utilized by selection circuit 140.

The logic cell shown in FIG. 8 contains several logic AND gates 146–152 connected to inverter circuits 142. These AND gates provide a signal to the inverter circuits 142 indicating whether a lesser significant bit among the current group of bits $a_5$-$a_0$ contains a zero value. For example, AND gate 152 has five inputs, one for each bit $a_4$-$a_0$. If each of the five bits have a value of one, then the output from AND gate 152 is high. However, if any one of bits $a_4$-$a_0$ has a value of zero, then the output from AND gate 152 is also zero. Regarding bit $a_0$, an inverter 144 provides an inverted version of bit $a_0$ rather than an inverter circuit 142. Since $a_0$ is the least significant bit in the group $a_5$-$a_0$, no bit of lesser significance exists to indicate whether bit $a_0$ should be inverted. Therefore, this determination is based only on the value of the IN signal.

Regarding bit $a_1$, an inverter circuit 142 is provided, but no AND gate is necessary because only one bit of lesser significance exists ($a_0$). Therefore, the bit $a_0$ is connected directly to inverter circuit 142, rather than to an AND gate.

Figure 9:
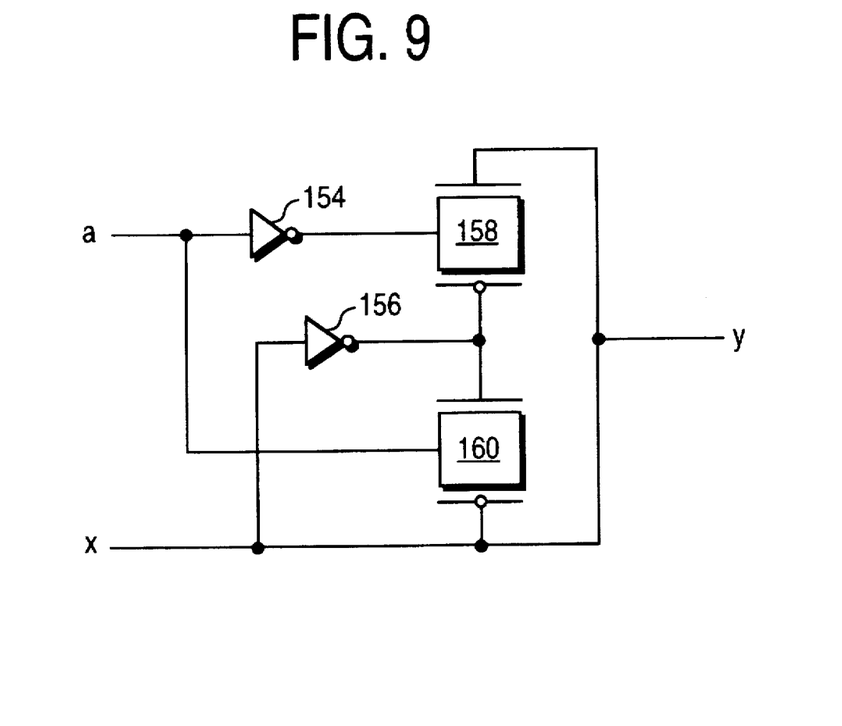
FIG. 9 is a schematic diagram of the inverter circuit of FIG. 8.

Referring to FIG. 9, a detailed circuit schematic diagram of inverter circuit 142 is illustrated. In general, inverter circuit 142 acts as a multiplexer to select either the inverted version of the bit or the noninverted version, depending on the value of an input x. An inverter 154 generates an inverted version of the bit line being processed, and provides that inverted bit value to a pass gate 158 comprising parallel-connected NMOS and PMOS transistors. An inverter 156 generates an inverted version of the signal labeled x, and provides that inverted signal to a pass gate 160 as well as pass gate 158. If signal x is low, indicating that the least significant zero has already been located, then pass gate 160 is activated, thereby providing the non-inverted bit value as output signal y. If signal x is high, indicating that the least significant zero has not been located, then pass gate 158 is activated to generate the inverted bit value as output signal y.

Figure 10:
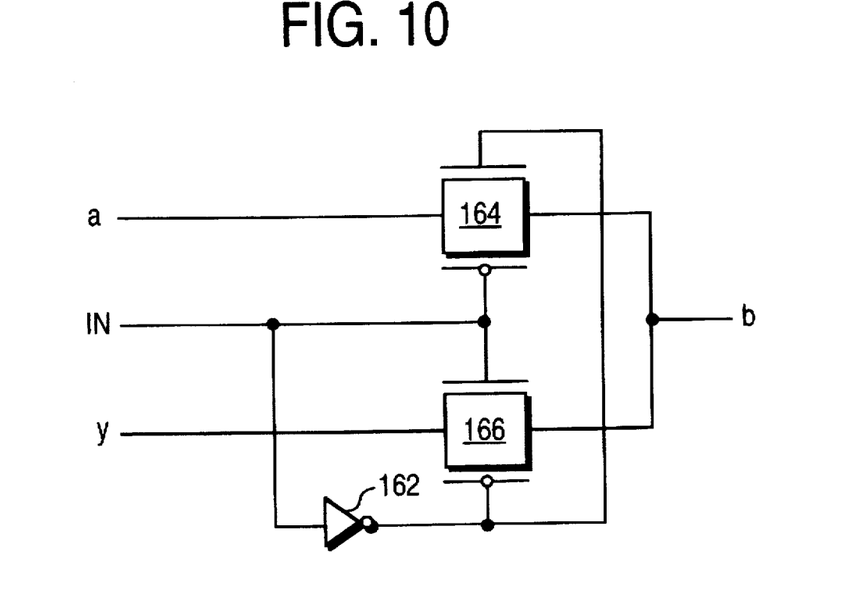
FIG. 10 is a schematic diagram of the selection circuit of FIG. 8.

Referring to FIG. 10, a detailed circuit schematic diagram of selection circuit 140 is illustrated. In general, inverter circuit 140 functions as a multiplexer to select either the non-inverted version of the bit or signal y, depending on the value of an input IN. An inverter 162 generates an inverted version of the IN signal, and provides that inverted value to pass gates 164 and 166 comprising parallel-connected NMOS and PMOS transistors. If signal IN is low, indicating that the least significant zero has already been located in a previous group of bits, then pass gate 164 is activated, thereby providing the non-inverted bit value as incremented bit b. If signal IN is high, indicating that the least significant zero has not been located in a previous group of bits, then pass gate 166 is activated to provide the output of inverter circuit 142 (signal y) as the value of incremented bit b.

The logic cell illustrated in FIG. 8 is a 6-bit logic cell; i.e., capable of processing a group of six bits of the number being incremented. A 5-bit logic cell as used with the present invention is identical to the 6-bit cell shown in FIG. 8, but without the bit lines for $a_5$ and $b_5$ and the associated circuitry. Thus, a 5-bit cell includes only four inverter circuits 142, five selection circuits 140, and does not include logic AND gate 152. The remaining structure and operation of the 5-bit cell is identical to that of the 6-bit cell described above.

Referring to FIG. 6, a diagram of the 29 bit incrementer 46 and single precision logic circuit 52 is shown. Incrementer 46 includes five logic AND gates 80–88, and five logic cells 98–106. Each AND gate and each logic cell receives either five or six bits from the bit segment $a_{39}$-$a_{11}$. Each AND gate generates a signal (C3–C7) indicating whether a zero exists in any of the bits connected to the AND gate. Each logic cell receives a signal at the IN line indicating whether a zero was found in any less significant bits. For example, logic cell 106 receives the output signal from AND-OR gate 68 (FIG. 5). If a high signal is provided to logic cell 106, then the logic cell continues to invert input bits $a_{16}$-$a_{11}$ until a zero is found. If a low signal is provided to logic cell 106, then the logic cell passes bits $a_{16}$-$a_{11}$ to output bits $b_{16}$-$b_{11}$ unchanged.

Logic cell 104 receives a high input on the IN line if both signal C3 and the signal from AND-OR gate 68 are high. Similarly, logic cells 102, 100, and 98 include signals C4, C5, and C6 ANDed with the previously described signals. Thus, the IN line for each logic cell is an indication of whether a zero was found in any preceding bits; i.e., bits of lesser significance.

Signals C1–C7 are connected to the AND inputs of an AND-OR gate 78, contained within single precision logic circuit 52. Logic circuit 52 operates in a manner similar to logic circuit 54 discussed above with reference to FIG. 5. Logic circuit 52 receives a signal SP indicating whether the number being incremented is a single precision number. If signal SP is high, then the number is single precision and bits $a_{39}$-$a_0$ are ignored (see FIG. 2). In this situation, the SP signal overrides any zeros found in bits $a_{39}$-$a_0$, and instead provides a high signal on line 66. Therefore, in single precision mode, the logic circuit ignores all previously detected zeros.

If signal SP is low, then signals C1–C7 are ANDed together to provide a signal on line 66. As stated previously, a high signal on line 66 indicates that all bits $a_{39}$-$a_0$ have a value of one (or are ignored because of the SP signal), and the next logic cell should continue inverting bits until a value of zero is located. A low signal on line 66 indicates that a zero has already been found, and the remaining logic cells should not invert the input bits.

Referring to FIG. 7, a diagram of the 24 bit incrementer 44 is shown. Incrementer 44 includes three logic AND gates 108–112, and four logic cells 120–126. Each AND gate and each logic cell receives six bits from the bit segment $a_{63}$-$a_{40}$. Each AND gate generates a signal (C8–C10) indicating whether a zero exists in any of the bits connected to the AND gate. Each logic cell receives a signal at the IN line indicating whether a zero was found in any less significant bits. For example, logic cell 126 receives the output signal from AND-OR gate 78 (FIG. 6). If a high signal is provided to logic cell 126, then the logic cell continues to invert input bits $a_{45}$-$a_{40}$ until a zero is found. If a low signal is provided to logic cell 126, then the logic cell passes bits $a_{45}$-$a_{40}$ to output bits $b_{45}$-$b_{40}$ unchanged.

Logic cell 124 in FIG. 7 receives a high input on the IN line if both signal C8 and the signal from AND-OR gate 78 are high. Similarly, logic cells 122, and 120 include signals C9 and C10 ANDed with the previously described signals. Thus, the IN line for each logic cell is an indication of whether a zero was found in any preceding bits; i.e., bits of lesser significance.

As illustrated above, the incrementer circuit of the present invention requires a small amount of extra circuitry compared to a simple incrementer. Namely, the addition of two AND-OR gates 68 and 78 provide the necessary additional logic circuits 52 and 54. As shown in FIG. 4, logic circuits 52 and 54 are operated in parallel, thereby minimizing the delay associated with the circuits, regardless of the precision mode of the number being incremented. Furthermore, incrementer portions 44, 46, and 48 are arranged in parallel to reduce processing delays. Thus, the overall delay of incrementer 40 is not significantly greater than the delay associated with a simple incrementer.

Figure 11:
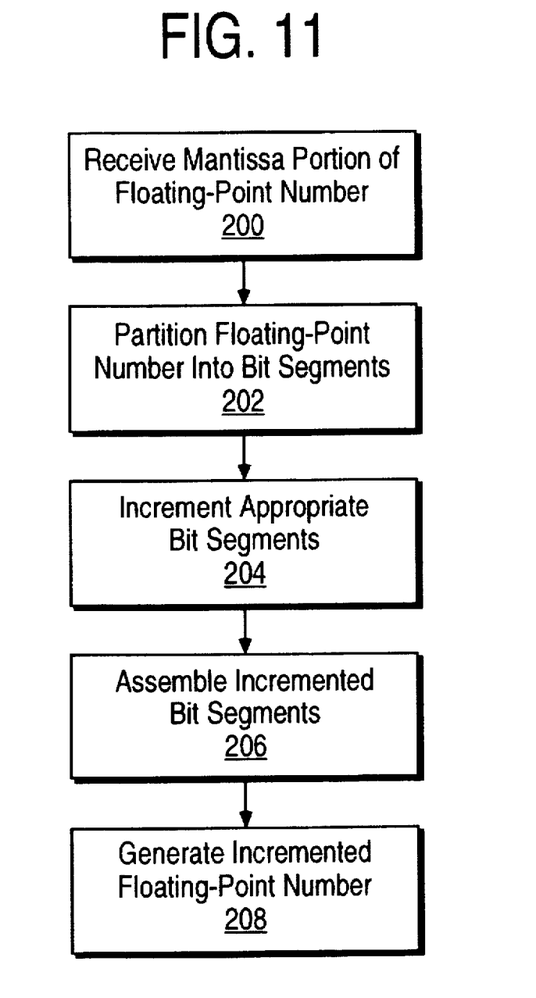
FIG. 11 is a flow chart illustrating the operation of the incrementer shown in FIG. 4.

Referring to FIG. 11, a flow chart illustrates the general operation of the incrementer shown in FIG. 4. The mantissa portion of the floating-point number is received at step 200 and then partitioned into three different bit segments at step 202. These three bit segments correspond to bits $a_{10}$-$a_0$, $a_{39}$-$a_{11}$, and $a_{63}$-$a_{40}$ as shown in FIGS. 5–7. At step 204, appropriate bit segments are incremented by the corresponding incrementer portion 44, 46 or 48. After the appropriate bit segments are incremented, the incremented bit segments are concatenated to form a single 64-bit incremented number. Finally, the incremented floating-point number is generated at step 208 and provided to the next stage of the processing circuitry.

In the embodiment of the invention described above, various combinations of the 5-bit and 6-bit logic cells may be used to implement each of the three incrementer portions. However, those skilled in the art will appreciate that logic cells having fewer bits or a greater number of bits may also be used to practice the present invention. Furthermore, skilled artisans will understand that in certain situations, a single type of logic cell may be used, and in other situations, three or more different types of logic cells may be utilized.

The illustrative embodiment includes three incrementer portions of different bit lengths, as described above. The use of three precision types and a 64-bit mantissa is provided for illustration purposes only. Different systems may utilize a mantissa having a different number of bits or may provide more or less than three precision types. The principles of the present invention are equally applicable to those situations.

From the above description and drawings, it will be understood by those skilled in the art that the particular embodiments shown and described are for purposes of illustration only and are not intended to limit the scope of the invention. Those skilled in the art will recognize that the invention may be embodied in other specific forms without departing from its spirit or essential characteristics. References to details of particular embodiments are not intended to limit the scope of the claims.

What is claimed is:

1. An apparatus for incrementing a floating-point number represented in one of a plurality of precision modes, said apparatus comprising:

a plurality of incrementers coupled to one another, each incrementer being associated with at least one of said plurality of precision modes; circuitry coupled to said plurality of incrementers to partition said floating-point number into a plurality of bit segments, each bit segment having an associated number; and a logic circuit coupled between a pair of said incrementers for controlling incrementing of said bit segments.

2. The apparatus of claim 1 further including circuitry coupled to said plurality of incrementers to concatenate said bit segments into an incremented floating-point number.

3. The apparatus of claim 1 wherein each incrementer includes at least one logic cell coupled to receive and increment one of said bit segments.

4. The apparatus of claim 3 wherein said apparatus generates an incremented floating-point number and each logic cell generates a portion of said incremented floating-point number.

5. The apparatus of claim 3 wherein each logic cell includes a plurality of inverters and a plurality of multiplexers.

6. The apparatus of claim 1 wherein each incrementer includes a logic AND gate having a plurality of inputs coupled to receive one of said bit segments, said logic AND gate having an output coupled to said logic circuit.

7. The apparatus of claim 1 wherein said logic circuit comprises a logic AND-OR circuit.

8. An apparatus for incrementing a floating-point number represented in one of a plurality of precision modes, said apparatus comprising:

a first incrementer corresponding to a first floating-point precision mode;

a second incrementer coupled to said first incrementer and corresponding to a second floating-point precision mode;

a third incrementer coupled to said first and second incrementers and corresponding to a third floating-point precision mode;

a first logic circuit coupled to said first and second incrementers to control said second incrementer; and a second logic circuit coupled to said second and third incrementers to control said third incrementer.

9. The apparatus of claim 8 further including circuitry coupled to said first, second, and third incrementers to partition said floating-point number into a plurality of bit segments, each bit segment having an associated number and being associated with one of said incrementers.

10. The apparatus of claim 9 wherein each bit segment is incremented by one of said incrementers to generate an incremented bit segment, said incrementer further including circuitry coupled to said first, second, and third incrementers to concatenate said incremented bit segments into an incremented floating-point number.

11. The apparatus of claim 9 wherein each of said first, second, and third incrementers includes at least one logic cell coupled to receive and increment one of said bit segments.

12. The apparatus of claim 11 wherein said apparatus generates an incremented floating-point number and each logic cell generates a portion of said incremented floating-point number.

13. The apparatus of claim 11 wherein each logic cell includes a plurality of inverters and a plurality of multiplexers.

14. The apparatus of claim 8 wherein said incrementers include a plurality of first and second logic cells arranged in various combinations within each incrementer.

15. The apparatus of claim 8 wherein each of said first and second logic circuits comprises a logic AND-OR circuit.

16. In a floating-point processor, a method of incrementing a floating-point number, the method comprising the steps of:

partitioning said floating-point number into a plurality of incrementers each incrementer being associated with at least one of a plurality of precision modes;

partitioning said floating-point number into a plurality of bit segments, each bit segment having an associated number; selectively incrementing said bit segments of said floating-point number to generate a plurality of incremented bit segments; and concatenating said plurality of incremented bit segments to generate an incremented floating-point number.

17. The method of claim 16 wherein the incrementing step further includes the step of assigning each of said bit segments to one of said incrementers.

18. An apparatus for incrementing a floating-point number represented in one of a plurality of precision modes, said apparatus comprising:

a plurality of incrementers coupled to one another, wherein each incrementer is associated with at least one of said plurality of precision modes;

means coupled to said incrementers for partitioning said floating-point number into a plurality of bit segments, each bit segment having an associated number;

means for selectively incrementing said bit segments of said floating-point number utilizing said incrementers, and means for concatenating said plurality of incremented bit segments to generate an incremented floating-point number.

* * * * *